(12) United States Patent
Luo et al.

(10) Patent No.: US 11,405,705 B2
(45) Date of Patent: Aug. 2, 2022

(54) MULTI-RATE INTERLEAVED DOWNSTREAM FRAMES IN PASSIVE OPTICAL NETWORKS (PONS)

(71) Applicant: Huawei Technologies Co., Ltd., Shenzhen (CN)

(72) Inventors: Yuanqiu Luo, Cranbury, NJ (US); Frank Effenberger, Frisco, TX (US); Bo Gao, Wuhan (CN); Xiang Liu, Marlboro, NJ (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/153,461

(22) Filed: Jan. 20, 2021

(65) Prior Publication Data

US 2021/0176544 A1    Jun. 10, 2021

Related U.S. Application Data

(63) Continuation of application No. PCT/CN2019/090994, filed on Jun. 12, 2019.

(60) Provisional application No. 62/735,528, filed on Sep. 24, 2018.

(51) Int. Cl.
*H04Q 11/00* (2006.01)
*H04J 14/02* (2006.01)

(52) U.S. Cl.
CPC ...... *H04Q 11/0067* (2013.01); *H04J 14/0245* (2013.01); *H04Q 11/0066* (2013.01); *H04Q 11/0071* (2013.01)

(58) Field of Classification Search
CPC .................................................. H04Q 11/0067
See application file for complete search history.

(56) References Cited

U.S. PATENT DOCUMENTS

| 2008/0002977 A1 | 1/2008 | Mori |
| 2008/0267625 A1 | 10/2008 | Effenberger |
| 2009/0208207 A1 | 8/2009 | Suvakovic |

(Continued)

FOREIGN PATENT DOCUMENTS

| CN | 101409708 A | 4/2009 |
| CN | 101946524 A | 1/2011 |

(Continued)

OTHER PUBLICATIONS

Alphion Corporation, "High-sensitivity, Multi-rate, Multi-band OLT Receiver for Hybrid 1G / 10G Passive Optical Networks," ECOC 2008, Sep. 21-25, 2008, Brussels, Belgium, 2 pages.

(Continued)

*Primary Examiner* — Shi K Li
(74) *Attorney, Agent, or Firm* — Conley Rose, P.C.

(57) ABSTRACT

A method implemented by an optical line terminal (OLT) comprising a memory storage comprising instructions, a processor in communication with the memory, wherein the processor executes the instructions to generate a multi-rate downstream frame having a pre-defined length, the multi-rate downstream frame comprising a plurality of subframes that are each associated with a respective data rate, and a transmitter coupled to the processor and configured to transmit each subframe of the plurality of subframes of the multi-rate downstream frame at the respective data rate.

23 Claims, 11 Drawing Sheets

(56) References Cited

U.S. PATENT DOCUMENTS

| | | | | |
|---|---|---|---|---|
| 2010/0067913 | A1* | 3/2010 | Niibe | H04Q 11/0067 398/98 |
| 2013/0077961 | A1* | 3/2013 | Dvir | H04B 10/071 398/16 |
| 2015/0043908 | A1* | 2/2015 | Prause | H04B 10/27 398/34 |
| 2018/0035183 | A1 | 2/2018 | Kim et al. | |
| 2018/0077475 | A1* | 3/2018 | Ye | H04J 14/00 |
| 2019/0253152 | A1* | 8/2019 | Houtsma | H04J 14/0282 |

FOREIGN PATENT DOCUMENTS

| | | | |
|---|---|---|---|
| CN | 106954103 A | 7/2017 | |
| CN | 106576010 B | 4/2019 | |
| JP | 2007243796 A | 9/2007 | |
| WO | WO-2016183830 A1 * | 11/2016 | H04B 10/272 |

OTHER PUBLICATIONS

Wu Jintao, "Research of GPON Technology and Its Application in the Broadband Access Network," Shan Dong University, Nov. 20, 2015, 77 pages.

ITU-T G.984.3, "Series G: Transmission Systems and Media,Digital Systems and Networks; Digital sections and digital line system, Optical line, systems for local and access networks," Jan. 2014, 170 pages.

ITU-T G.987.3, "Series G: Transmission Systems and Media,Digital Systems and Networks; Digital sections and digital line system, Optical line, systems for local and access networks," Jan. 2014, 146 pages.

"40-Gigabit-capable passive optical networks (NG-PON2): Transmission Convergence Layer Specification," Series G: Transmission Systems and Media, Digital Systems and Networks Digital sections and digital line system—Optical line systems for local and access networks, ITU-T, G.989.3, Oct. 2015, 288 pages.

Shandong University, "Research of GPON Technology and its Application in the Broadband Access Network," Thesis for Master Degree, Nov. 20, 2015, 77 pages.

Piehler, D., et al., "High-sensitivity, Multi-rate, Multi-band OLT Receiver for Hybrid 1G/10G Passive Optical Networks," vol. 3-139, IEEE, 2008, 2 pages.

"Series G: Transmission Systems and Media, Digital Systems and Networks; Digital sections and digital line system—Optical line systems for local and access networks; Gigabit-capable passive optical networks (G-PON): Transmission convergence layer specification," ITU-T, G.984.3, Jan. 2014, 170 pages.

"Series G: Transmission Systems and Media, Digital Systems and Networks; Digital sections and digital line system—Optical line systems for local and access networks; 10-Gigabit-capable passive optical networks (XG-PON) Transmission convergence (TO) layer specification," ITU-T, G.987.3, Jan. 2014, 146 pages.

"Series G: Transmission Systems and Media, Digital Systems and Networks; Access networks—Optical line systems for local and access networks; Higher speed passive optical networks—Common transmission convergence layer specification," Recommendation ITU-T G.9804.2, Sep. 2021, 246 pages.

* cited by examiner

SUBFRAMES OF EQUAL SIZE, SIMILAR FRAMES

SUBFRAMES OF DIFFERENT SIZE, SIMILAR FRAMES

LENGTHS DIFFER BETWEEN SUCCESSIVE SUBFRAMES (MIXED REGULAR AND MULTI-RATE FRAMES)

SUBFRAMES OF EQUAL SIZE, SIMILAR FRAMES

FRAMES WITH DIFFERING NUMBERS OF SUBFRAMES

MULTI-RATE INTERLEAVED DOWNSTREAM FRAMES IN PASSIVE OPTICAL NETWORKS (PONS)

CROSS-REFERENCE TO RELATED APPLICATIONS

This application is a continuation of International Patent Application PCT/CN2019/090994 filed Jun. 12, 2019 by Huawei Technologies Co., Ltd. and claims the benefit of U.S. Provisional Patent Application No. 62/735,528, filed Sep. 24, 2018 by Futurewei Technologies, Inc. and titled "Multi-Rate Interleaved Downstream Frames in Passive Optical Networks (PONs)," both of which are hereby incorporated herein by reference in their entireties.

FIELD OF INVENTION

The present disclosure pertains to the field of Passive Optical Networks (PONs). In particular, the present disclosure relates to optical line transmitters (OLTs) in a PON transmitting data downstream to multiple Optical Network Units (ONUs) at multiple different data rates.

BACKGROUND

A PON is one system for providing network access over the last mile, which is the final portion of a telecommunications network that delivers communication to customers. A PON is a point to multi-point network comprising an OLT at a Central Office (CO), ONUs at user premises, and an optical distribution network (ODN) coupling the OLT to the ONUs.

Next Generation PONs (NG-PONs) may combine Time-Division Multiplexing (TDM) and Wavelength-Division Multiplexing (WDM) to support higher capacities so that increased numbers of users can be served by a single OLT with sufficient bandwidth per user. In such a Time-and-Wavelength Division PON (TWDM PON), a WDM PON may be overlaid on top of a TDM PON. Thus, different wavelengths may be multiplexed together to share a single feeder fiber, and each wavelength may be shared by multiple users using TDM.

SUMMARY

According to a first aspect of the present disclosure, there is provided an optical line transmitter (OLT). The OLT comprises a memory storage comprising instructions, a processor in communication with the memory, wherein the processor executes the instructions to generate a multi-rate downstream frame having a pre-defined length, the multi-rate downstream frame comprising a plurality of subframes that are each associated with a respective data rate, and a transmitter coupled to the processor and configured to transmit each subframe of the plurality of subframes of the multi-rate downstream frame at the respective data rate.

In a first implementation of the OLT according to the first aspect, the processor is further configured to encapsulate the each subframe of the plurality of subframes to include a header that indicates a frame boundary of the each subframe e and the respective data rate associated with the each subframe.

In a second implementation of the OLT according to the first aspect or any preceding implementation of the first aspect, the processor is further configured to encapsulate the each subframe of the plurality of subframes to include a physical synchronization block (PSBd), the PSBd comprising a Subframe Length Indicator (SLI) field that indicates a subframe length of the each subframe.

In a third implementation of the OLT according to the first aspect or any preceding implementation of the first aspect, the processor is further configured to encapsulate the each subframe of the plurality of subframes to include a physical synchronization block (PSBd), a subframe length of the each subframe being carried in a reserved or unused field of the PSBd.

In a fourth implementation of the OLT according to the first aspect or any preceding implementation of the first aspect, the processor is further configured to insert an End-of-Subframe (EoS) indicator between subframes of the plurality of subframes during transmission.

In a fifth implementation of the OLT according to the first aspect or any preceding implementation of the first aspect, the pre-defined length of the multi-rate downstream frame is 125 microseconds.

In a sixth implementation of the OLT according to the first aspect or any preceding implementation of the first aspect, the plurality of subframes comprises a first subframe and a second subframe, the first subframe being associated with the respective data rate of 25 gigabits per second (25G), and the second subframe being associated with the respective data rate of 50 gigabits per second (50G).

In a seventh implementation of the OLT according to the first aspect or any preceding implementation of the first aspect, a first portion of the multi-rate downstream frame is allocated to the first subframe, and a second portion of the multi-rate downstream frame is allocated to the second subframe.

According to a second aspect of the present disclosure, there is provided a computer program product comprising computer executable instructions stored on a non-transitory computer readable medium. The instructions, when executed by a processor, causes an OLT to generate a multi-rate downstream frame having a pre-defined length, the multi-rate downstream frame comprising a plurality of subframes that are each associated with a respective data rate, and transmit each of the plurality of subframes of the multi-rate downstream frame at the respective data rate.

In a first implementation of the OLT according to the second aspect, the computer executable instructions, when executed by the processor, further cause the processor to encapsulate the each subframe of the plurality of subframes to include a header that indicates a frame boundary of the each subframe and the respective data rate associated with the each subframe.

In a second implementation of the OLT according to the second aspect or any preceding implementation of the second aspect, the each subframe of the plurality of subframes has a different length that is less than the pre-defined length.

In a third implementation of the OLT according to the second aspect or any preceding implementation of the second aspect, the each subframe of the plurality of subframes has a common length that is less than the pre-defined length.

In a fourth implementation of the OLT according to the second aspect or any preceding implementation of the second aspect, the computer executable instructions, when executed by the processor, further cause the processor to combine a plurality of first payload frames associated with a first data rate to create a first subframe of the plurality of subframes, combine a plurality of second payload frames associated with a second data rate to create a second payload for a second subframe of the plurality of subframes, encapsulate the first subframe to include a first header indicating the first data rate, and encapsulate the second subframe to include a second header indicating the second data rate, wherein the first subframe and the second subframe are continuously transmitted.

According to a third aspect of the present disclosure, there is provided a method. The method is implemented by an OLT, and the method comprises generating, by the OLT, a multi-rate downstream frame having a pre-defined length, the multi-rate downstream frame comprising a plurality of subframes that are each associated with a respective data rate, and transmitting, by the OLT, each subframe of the plurality of subframes at the respective data rate.

In a first implementation of the method according to the third aspect, generating the multi-rate downstream frame comprises encapsulating, by the OLT, the each subframe of the plurality of subframes to include a header that indicates a frame boundary of the each subframe and the respective data rate associated with the each subframe.

In a second implementation of the computing device according to the third aspect or any preceding implementation of the third aspect, generating the multi-rate downstream frame comprises encapsulating, by the OLT, the each subframe of the plurality of subframes to include a PSBd, the PSBd comprising a SLI field that indicates a subframe length of the each subframe.

In a third implementation of the method according to the third aspect or any preceding implementation of the third aspect, generating the multi-rate downstream frame comprises encapsulating, by the OLT, the each subframe of the plurality of subframes to include a physical synchronization block (PSBd), a subframe length of the each subframe being carried in a reserved or unused field of the PSBd.

In a fourth implementation of the method according to the third aspect or any preceding implementation of the third aspect, the method further comprises inserting, by the OLT, an End-of-Subframe (EoS) indicator between the each subframe of the plurality of subframes during transmission to the ONU.

In a fifth implementation of the method according to the third aspect or any preceding implementation of the third aspect, the pre-defined length of the multi-rate downstream frame is 125 microseconds.

In a sixth implementation of the method according to the third aspect or any preceding implementation of the third aspect, the plurality of subframes comprises a first subframe and a second subframe, the first subframe being associated with the respective data rate of 25 gigabits per second (25G), and the second subframe being associated with the respective data rate of 50 gigabits per second (50G).

According to a fourth aspect of the present disclosure, there is provided an ONU. The ONU comprises a receiver configured to receive a multi-rate downstream frame, with the multi-rate downstream frame having a pre-defined length and comprising a plurality of subframes that are each associated with a different data rate, and a processor coupled to the receiver and configured to determine whether to process a subframe of the plurality of subframes based on a data rate indicated in a header of the subframe.

In a first implementation of the ONU according to the fourth aspect, the processor is further configured to process the subframe of the plurality of subframes in response to the header of the subframe indicating the data rate that is supported by the ONU.

In a second implementation of the ONU according to the fourth aspect or any preceding implementation of the fourth aspect, the processor is further configured to ignore the subframe of the plurality of subframes in response to the header of the subframe indicating the data rate that is not supported by the ONU.

Typically, OLTs are only configured to transmit data downstream at a single data rate, regardless of whether the OLT is capable of transmitting data at multiple different data rates. The embodiments disclosed herein enable the OLT to transmit data downstream at multiple different data rates, thereby transmitting data in a more efficient manner to multiple ONUs. The ONUs may also receive data from the OLT at a faster rate when the ONU supports a particular data rate.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In a conventional TWDM PON, the OLT operates on a single downstream wavelength at a single data rate. A data rate refers to a speed at which data can be transmitted from the OLT to an ONU, or from an ONU to an OLT. For example, in a Gigabit PON (GPON) system, downstream data is broadcasted at about 2.48832 Gigabits per second (Gbps) (hereinafter referred to as 2.5G) while upstream data is transmitted at about 1.25 Gbps. In a ten Gbps PON (XG-PON) system, downstream data is broadcasted at about 9.95328 Gbps (hereinafter referred to as 10G) while upstream data is transmitted at about 10 G or 2.5G. Some emerging next generation high speed PON systems anticipate broadcasting data downstream at much higher data rates, such as 25 Gbps (hereinafter referred to as 25G) and 50 Gbps (hereinafter referred to as 50G). For example, the International Telecommunication Union (ITU) Telecommunication Standardization Sector (ITU-T) is introducing a new series, referred to as G.hsp, for next generation high speed PONs in which OLTs are configured to transmit data downstream at 25G or 50G.

However, typical OLTs in a PON only transmit data downstream to ONUs at a single data rate, even though the OLTs are capable of transmitting data downstream at more than one data rate. For example, an OLT may be configured to transmit data at 1G, 2.5G, 10G, 25G, or 50G. However, the OLT is typically preset to transmit data downstream at only one of these data rates. For this reason, there is no protocol that can be used by an OLT to transmit data downstream at different data rates.

The embodiments disclosed herein are directed to a protocol frame structure that enables an OLT to transmit data downstream at different data rates. The protocol frame structure may be created by dividing a typical downstream frame into multiple subframes, in which each subframe is associated with a different data rate, and each subframe includes a header indicating a respective data rate and/or a length of the subframe.

The embodiments disclosed herein enable the OLT to transmit data downstream at multiple different data rates, thereby transmitting data in a more efficient manner to multiple ONUs. The ONUs may also receive data from the OLT at a faster rate when the ONU supports a particular data rate.

Figure 1:
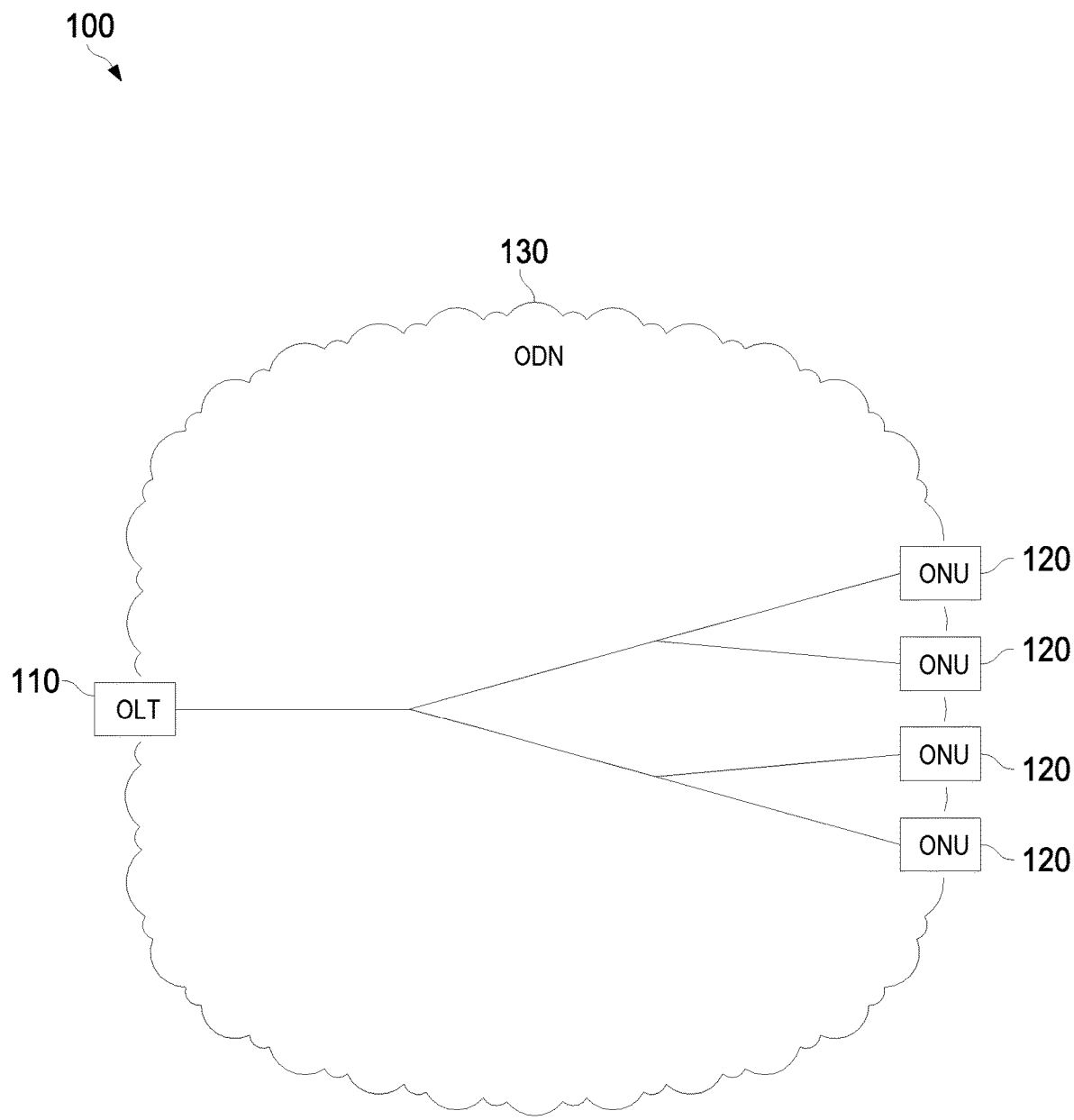
FIG. 1 is a schematic diagram of a PON according to various embodiments of the disclosure.

FIG. 1 is a schematic diagram of a PON 100. The PON 100 comprises an OLT 110, ONUs 120, and an ODN 130 that couples the OLT 110 to the ONUs 120. The PON 100 is a communications network that may not require active components to distribute data between the OLT 110 and the ONUs 120. Instead, the PON 100 may use passive optical components in the ODN 130 to distribute data between the OLT 110 and the ONUs 120.

The OLT 110 communicates with another network and with the ONUs 120. Specifically, the OLT 110 is an intermediary between the other network and the ONUs 120. For instance, the OLT 110 forwards data received from the other network to the ONUs 120 and forwards data received from the ONUs 120 to the other network. The OLT 110 comprises a transmitter and a receiver. When the other network uses a network protocol that is different from the protocol used in the PON 100, the OLT 110 comprises or includes a converter that converts the network protocol to the PON protocol and vice versa. The OLT 110 is typically located at a central location such as a CO, but it may also be located at other suitable locations.

The ODN 130 is a data distribution network that comprises optical fiber cables, couplers, splitters, distributors, and other suitable components. The components include passive optical components that do not require power to distribute signals between the OLT 110 and the ONUs 120. Alternatively, the components include active components such as optical amplifiers that do require power. The ODN 130 extends from the OLT 110 to the ONUs 120 in a branching configuration as shown, but the ODN 130 may be configured in any other suitable point-to-multipoint (P2MP) configuration.

The ONUs 120 communicate with the OLT 110 and customers, and function as intermediaries between the OLT 110 and the customers. To do so, the ONUs 120 comprise optical transceivers that receive optical signals from the OLT 110, convert the optical signals into electrical signals, and provide the electrical signals to the customers. The transceivers also receive electrical signals from the customers, convert the electrical signals into optical signals, and transmit the optical signals to the OLT 110. ONUs 120 and optical network terminals (ONTs) are similar, and the terms may be used interchangeably. The ONUs 120 are typically located at distributed locations such as customer premises, but they may also be located at other suitable locations.

As mentioned above, a data rate refers to a speed at which data can be transmitted from the OLT 110 to an ONU 120, or from an ONU 120 to an OLT 110. PON 100 may be a current standard PON that is capable of providing data rates of 1G, 2.5G, or 10G. In this PON 100, the OLT 110 and the ONUs 120 are capable of transmitting and receiving data at data rates of 1G, 2.5G, or 10G. PON 100 may also be a next generation high speed PON that is capable of implementing increased data rates, such as 25G, 50G, and 100G. In this PON 100, the OLT 110 and the ONUs 120 are capable of transmitting and receiving data at data rates of 1G, 2.5G, 10G, 25G, 50G, and 100G.

A standard OLT 110 in a next generation high speed PON 100 may be configured to transmit data downstream to ONUs 120 at any data rate, such as 1G, 2.5G, 10G, 25G, 50G, or 100G. However, the OLT 110 may be pre-configured to transmit data to an ONU 120 at a single data rate over one physical channel, even though the OLT 110 is capable of transmitting data downstream at different data rates. Therefore, there is a need for developing a protocol that can be implemented by an OLT 110 and understood by an ONU 120 to enable the OLT 110 to transmit data downstream to the ONU 120 at different data rates.

Disclosed herein are embodiments for a downstream frame structure that can be implemented by the OLT 110 to support transmitting data downstream at more than one data rate. In an embodiment, an OLT 110 is configured to generate a multi-rate downstream frame having a pre-defined length, in which the multi-rate downstream frame comprises a plurality of subframes that are each associated with a different data rate. The OLT 110 may encapsulate the subframes to include a header that indicates a boundary of the subframe, a length of the subframe, and/or a data rate by which the subframe is transmitted to the ONU 120. The OLT 110 may be configured to transmit each of the subframes at the respective data rate to the ONUs 120 within the PON 100.

Figure 2:
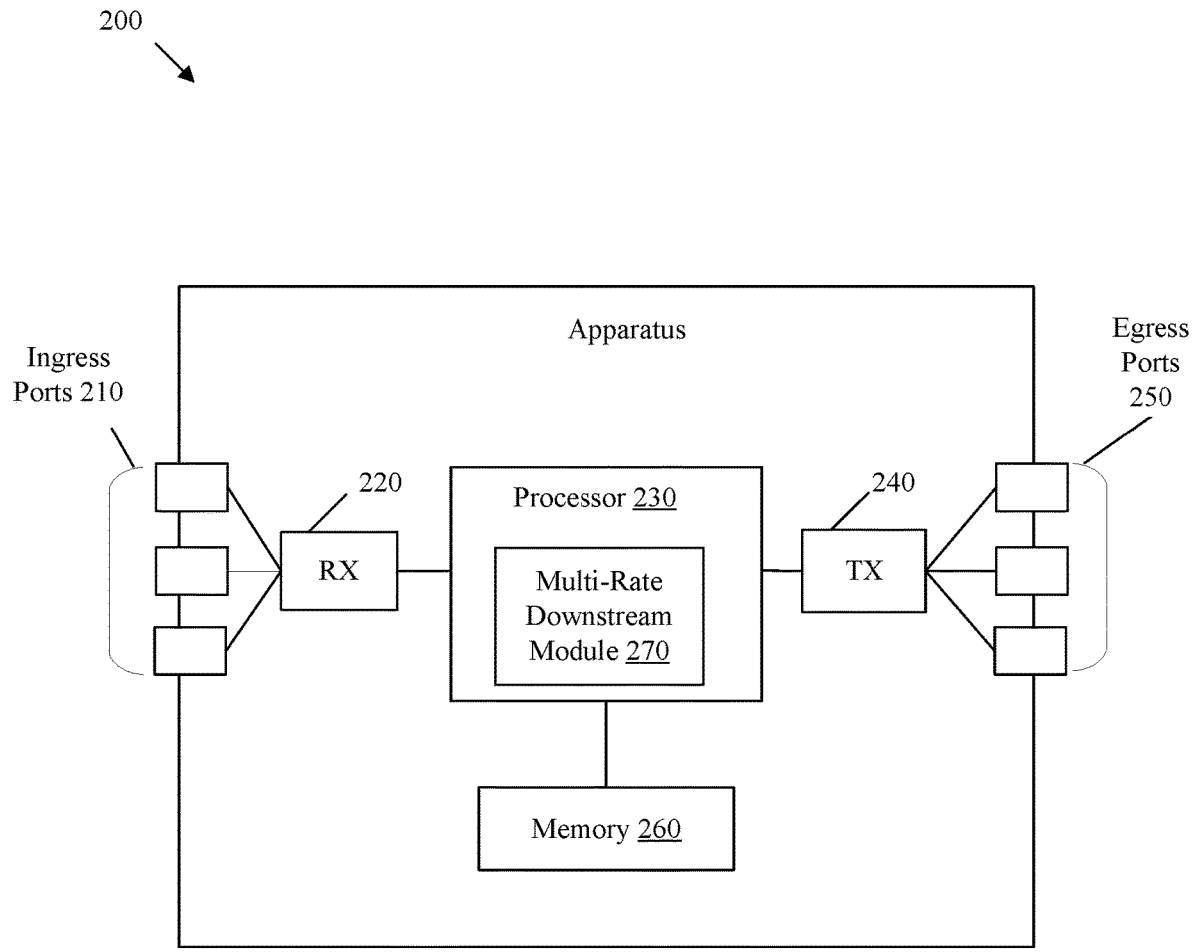
FIG. 2 is a diagram of an apparatus according to various embodiments of the disclosure.

FIG. 2 is a schematic diagram of an apparatus 200 according to various embodiments of the disclosure. The apparatus 200 may be, for example, an OLT 110 or an ONU 120, and may be configured to implement the disclosed embodiments. The apparatus 200 comprises ingress ports 210 and a receiver (RX) 220 coupled to the ingress ports 210 for receiving data; a processor, logic unit, baseband unit, or central processing unit (CPU) 230 coupled to the RX 220 to process the data; a transmitter (TX) 240 coupled to the processor 230 and egress ports 250 coupled to the TX 240 for transmitting the data; and a memory 260 coupled to the processor 230 for storing the data. The apparatus 200 may also comprise optical-to-electrical (OE) components, electrical-to-optical (EO) components, or radio frequency (RF) components coupled to the ingress ports 210, the RX 220, the TX 240, and the egress ports 250 for ingress or egress of optical, electrical signals, or RF signals.

The processor 230 is any combination of hardware, middleware, firmware, or software. The processor 230 comprises any combination of one or more CPU chips, cores, field-programmable gate arrays (FPGAs), application-specific integrated circuits (ASICs), or digital signal processors (DSPs). The processor 230 communicates with the ingress ports 210, the RX 220, the TX 240, the egress ports 250, and the memory 260. The processor 230 in some embodiments stores a multi-rate downstream module 270, which implements the disclosed embodiments. The processor 230 can include memory for holding the multi-rate downstream module 270, and the processor 230 can retrieve the multi-rate downstream module 270 and execute the instructions therein to perform operations of the apparatus 200. The inclusion of the multi-rate downstream module 270 therefore provides a substantial improvement to the functionality of the apparatus 200 and effects a transformation of the apparatus 200 to a different state. Alternatively, the memory 260 stores the multi-rate downstream module 270 as instructions, and the processor 230 executes those instructions.

The memory 260 comprises any combination of disks, tape drives, or solid-state drives. The apparatus 200 may use the memory 260 as an over-flow data storage device to store programs when the apparatus 200 selects those programs for execution. The apparatus 200 may use the memory 260 to store instructions. The apparatus 200 may use the memory 260 to store data that the apparatus 200 reads and/or generates during execution of those programs. The memory 260 may be volatile or non-volatile and may be any combination of read-only memory (ROM), random-access memory (RAM), ternary content-addressable memory (TCAM), or static RAM (SRAM).

Figure 3:
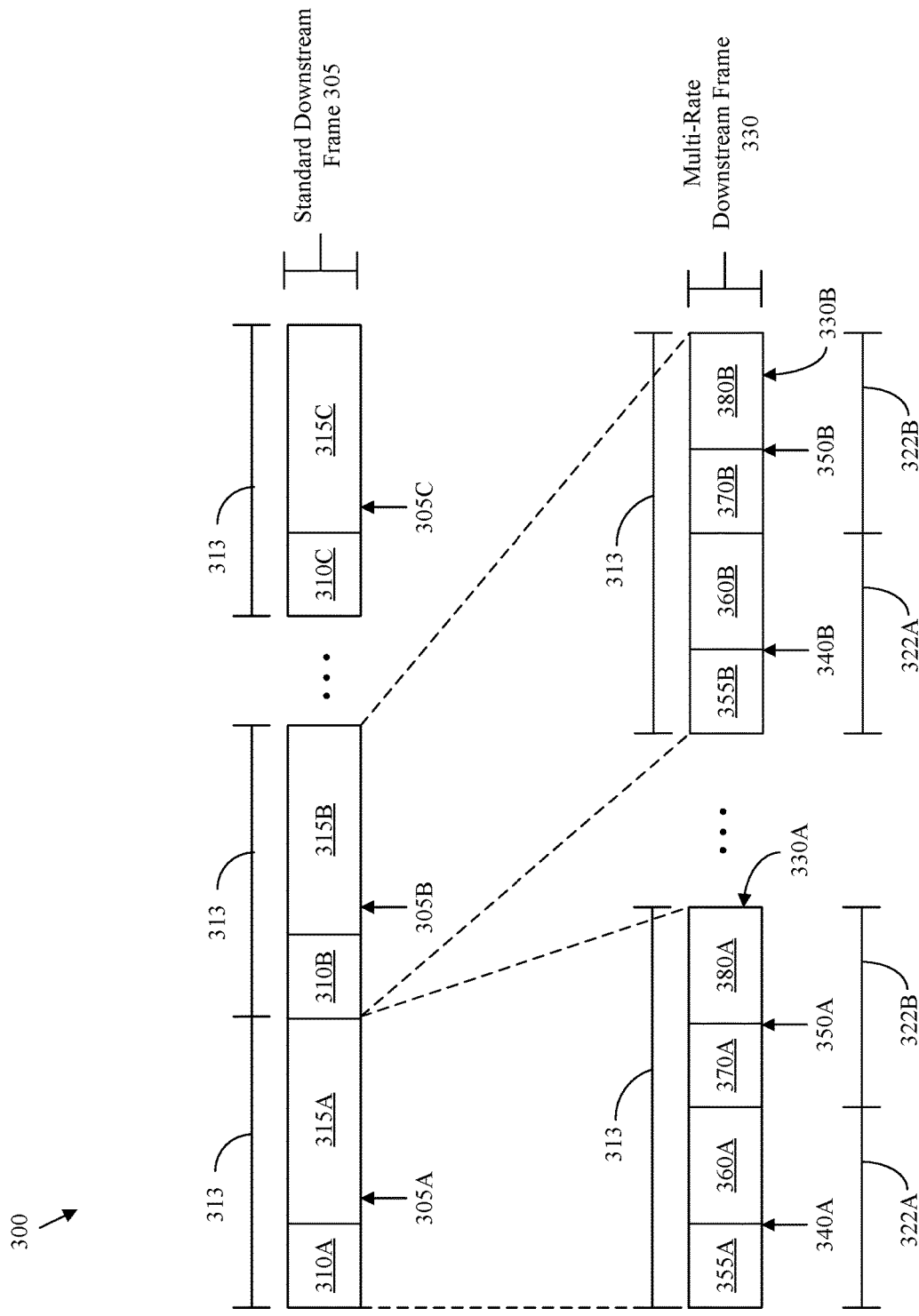
FIG. 3 is a diagram illustrating a comparison between a multi-rate downstream frame and a standard downstream frame according to various embodiments of the disclosure.

FIG. 3 is a diagram 300 illustrating a comparison between a standard downstream frame 305 and a multi-rate downstream frame 330 according to various embodiments of the disclosure. An OLT 110 may be configured to continuously transmit the standard downstream frames 305 in the downstream direction toward the ONUs 120 without any time delay in between the transmissions of the standard downstream frames 305.

The data transmitted by an OLT 110 may be partitioned into fixed size downstream frames 305A-C having a pre-defined length 313. Alternatively, the pre-defined length 313 comprises a predetermined time period length 313 or predetermined duration 313, but "length" will be used herein for brevity. According to the ITU-T Series G Standards Document, entitled "40-Gigabit-capable passive optical networks (NG-PON2): Transmission Convergence Layer Specification," dated October 2015 (referred to herein as the G.989.3 Standard Document), the pre-defined length 313 of the standard downstream frame 305A-C is a duration of 125 microseconds (µs). The number of bytes transmitted in a standard downstream frame 305A-C depends on the data rate employed by the OLT 110 in the PON 100. For example, in a PON 100 that implements the 10G communications standard, 155520 bytes (38880 words) are transmitted in a single standard downstream frame 305A-C. In a PON 100 that implements 2.5G, 38880 bytes (9720 words) are transmitted in a single standard downstream frame 305A-C. In this way, the higher the data rate employed by the OLT 110, the more data can be transmitted in a single standard downstream frame 305A-C having the pre-defined length 313.

In an embodiment, a standard downstream frame 305 includes a header 310 and a payload 315. In an embodiment in which the standard downstream frame 305 corresponds to the downstream frames described by the G.989.3 Standard Document, the header 310 may be physical synchronization blocks (PSBds), and the payload 315 may be a physical interface (PHY) frame payload. In an embodiment, the header 310A-C may carry downstream synchronization information, which will be further described below with reference to FIGS. 5 and 6. A start, or boundary, of a standard downstream frame 305A-C is defined by the first bit of the header 310A-C, or the PSBd.

The payload 315 may include user data in the form of XG-PON encapsulation method (XGEM) packets that are packed together by the OLT 110. The OLT 110 may pack the user data such that the length of the user data is less than the pre-defined length 313 of the standard downstream frame 305. In an embodiment, the payload 315 may have scrambled content that is protected by Forwarding Error Correction (FEC). In an embodiment, each payload 315 may further include a bandwidth map (BWmap) and one or more Physical Layer Operations, Administration, and Maintenance (PLOAM) messages.

In an embodiment, the OLT 110 is configured to encapsulate each of the payloads 315 with the corresponding header 310. For example, the OLT 110 may encapsulate the payload 315A to include the header 310A and create the standard downstream frame 305A. Similarly, the OLT 110 may encapsulate the payload 315B to include the header 310B and create the standard downstream frame 305B and encapsulate the payload 315C to include the header 310C and create the standard downstream frame 305C. While only three standard downstream frames 305 are shown in the figure, it should be appreciated that the OLT 110 is configured to send any number of standard downstream frames 310, such as to the ONU 120, for example.

After encapsulating each of the payloads 315 to include the headers 310, the OLT 110 is configured to transmit the standard downstream frames 305 to the ONUs 120 at a single pre-configured data rate. For example, the OLT 110 may be preset to transmit at a particular wavelength and at a particular data rate, such as 10G. In this case, the OLT 110 transmits each of the standard downstream frames 305 at the single data rate of 10G, regardless of whether a particular user data in the payloads 315 should be transferred at a different data rate.

FIG. 3 shows a multi-rate downstream transmission example including two multi-rate downstream frames 330A and 330B. The embodiments disclosed herein enable the OLT 110 to transmit multi-rate downstream frames 330 that essentially divide standard downstream frames 305 into multiple subframes based on the data rates available for transmission by the OLT 110. In an embodiment, a multi-rate downstream frame 330 has the same pre-defined length 313 as a standard downstream frame 305, which may be, for example, 125 µs. However, instead of having a single header 310 and a single payload 315, as included in the standard downstream packet 305, the multi-rate downstream packet 330 includes multiple subframes. The multi-rate downstream frame 330A includes subframes 340A and 350A in the example shown. The multi-rate downstream frame 330B includes subframes 340B and 350B. Each subframe 340A-B and 350A-B includes a header 355A-B or 370A-B and a payload 360A-B or 380A-B.

The multi-rate downstream frame 330 is the same pre-defined length 313 as the standard downstream frame 305, and is divided into subframes 340 and 350. As shown in FIG. 3, the multi-rate downstream frame 330A is divided into subframes 340A and 350A, and the multi-rate downstream frame 330B is divided into subframes 340B and 350B. Subframe 340A of multi-rate downstream frame 330A comprises header 355A and payload 360A, while subframe 350A comprises header 370A and payload 380A. Subframe 340B of multi-rate downstream frame 330B comprises header 355B and payload 360B, while subframe 350B comprises header 370B and payload 380B.

Figure 4A:
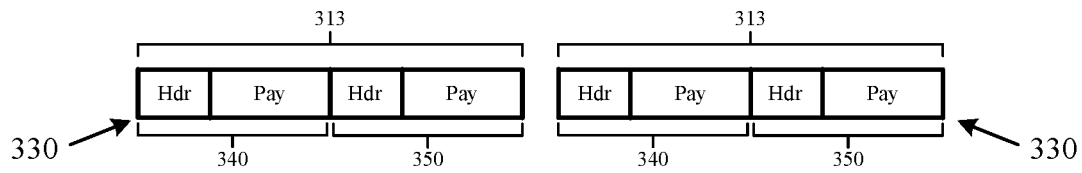
FIGS. 4A-4E show multi-rate downstream frame examples, illustrating various frame and subframe possibilities of multi-rate downstream frames according to various embodiments of the disclosure.

FIGS. 4A-4E show frame examples, illustrating various multi-rate downstream frame 330 and subframe 340 or 350 possibilities of multi-rate downstream frames 330. In FIG. 4A, a multi-rate downstream frame 330 having length 313 comprises equal length subframes 340 and 350. Further, successive multi-rate downstream frames 330 may also comprise identical subframes 340 and 350.

Figure 4B:
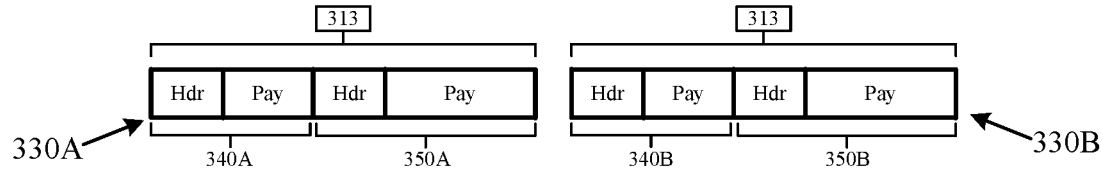

FIG. 4B shows a multi-rate downstream frame 330A-B having subframes 340A-B and 350A-B of unequal sizes. However, the combination of the subframes 340A-B and 350A-B is still of the length 313.

Figure 4C:
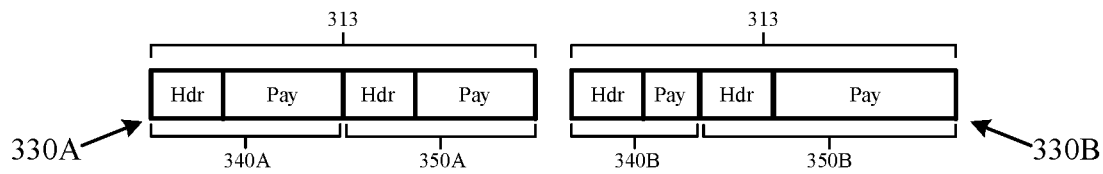

FIG. 4C shows a first multi-rate downstream frame 330A having subframes 340A and 350A of equal size, plus a second multi-rate downstream frame 330B having subframes 340B and 350B of unequal size (and differing from the subframes of the first frame 330A).

Figure 4D:
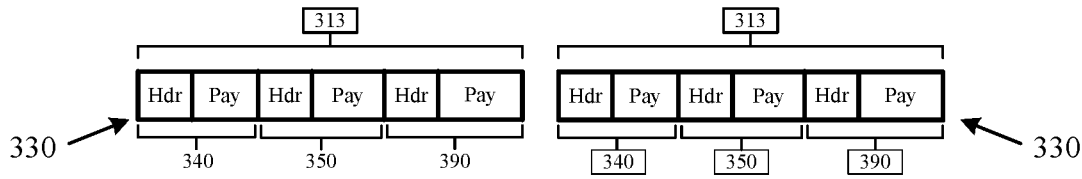

FIG. 4D shows a multi-rate downstream frame 330 including three subframes 340, 350, and 390. It should be noted that although the headers of the three subframes 340, 350, and 390 are portrayed as being smaller, this was done merely for illustration and is not meant to imply that the header size is variable. FIG. 4D shows a similar second subframe 330.

Figure 4E:
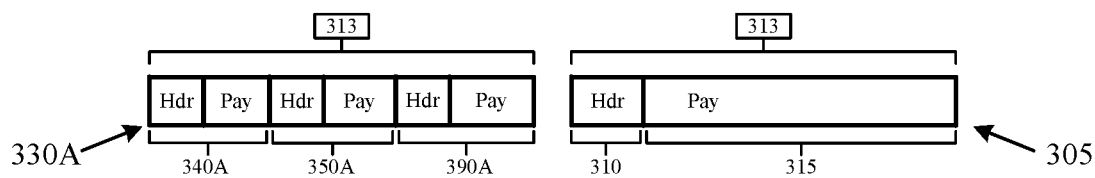

FIG. 4E shows a multi-rate downstream frame 330A having three subframes 340A, 350A, and 390A, and also shows a standard downstream frame 305. This figure therefore shows frames having different numbers of subframes. This figure also shows subframes of different sizes within a frame. This figure shows an example data flow having a mix of standard and multi-rate downstream frames.

As shown above in FIGS. 4A-E, a total length subframes within the multi-rate downstream frame 330 equals the pre-defined length 313 in some embodiments. Within a single multi-rate downstream frame 330, each of the subframes 340A-B and 350A-B may be substantially the same length 322A-B, or each of the subframes 340A-B and 350A-B may have different lengths 322A-B.

Referring back to FIG. 3, the payloads 360A and 380A within a multi-rate downstream frame 330A may be substantially the same length, or may have different lengths. The payloads 360A and 360B between different multi-rate downstream frames 330A and 330B may have substantially the same length, or may have different lengths.

In an embodiment, each subframe within the multi-rate downstream frame 330 may be transmitted by the OLT 110 at a different data rate. In an embodiment, subframe 340 is transmitted at a first data rate, while subframe 350 is transmitted at a second data rate. For example, subframe 340A includes data that is to be transmitted by the OLT 110 at a 25G data rate, and subframe 350A may include data that is to be transmitted by the OLT 110 at a 50G data rate.

As shown in FIG. 3, subframe 340A includes a header 355A and a payload 360A, and subframe 350A includes a header 370A and a payload 380A. Similarly, the multi-rate downstream frame 330B is the same pre-defined length 313 as the standard downstream frame 305B, except that the multi-rate downstream frame 330B is divided into subframes 340B and 350B. Continuing with the example, subframe 340B may include data that is to be transmitted by the OLT 110 at a 25G data rate, and subframe 350B may include data that is to be transmitted by the OLT 110 at a 50G data rate.

In an embodiment, the subframes 340 and 350 substantially evenly share the pre-defined length 313 of a multi-rate downstream frame 330. In another embodiment, the subframes 340 and 350 substantially evenly share the pre-defined length 313 in every multi-rate downstream frame 330 (i.e., all multi-rate downstream frame 330 are similarly divided into subframes 340 and 350). Similarly, subframes 340B and 350B may evenly share the length 313 of the multi-rate downstream frame 330B. In this embodiment, the length for each of subframes 340A and 350A are the same. Similarly, the length for each of subframes 340B and 350B are the same. While only two subframes 340A-B and 350A-B are shown for both the multi-rate downstream frames 330A-B, it should be appreciated that the multi-rate downstream frame 330A-B may include any number of subframes 340A-B and 350A-B that are each associated with a different data rate. In this embodiment, the multi-rate downstream frame 330A-B is equally divided into subframes 340A-B and 350A-B having an equal length, or a same length.

In an embodiment, subframes 340A and 350A may have different lengths, and the length of the subframes 340A and 350A may be less than the pre-defined length 313 of the multi-rate downstream frame 330A. Similarly, subframes 340B and 350B may also have different lengths that are less than the pre-defined length 313 of the multi-rate downstream frame 330A. For example, the lengths for each of subframes 340A and 350A may be different, and the sum of the lengths may equal the pre-defined length 313. Similarly, the length for each of subframes 340B and 350B may be different, and the sum of the lengths may equal the pre-defined length 313. In an embodiment, the lengths of the subframes 340 and 350 may be dynamically adjusted based on a size of the user data that needs to be included in each of the subframes. In the case when there are more than two subframes within a multi-rate downstream frame 330, the length of each of the subframes may be dynamically allocated based on a size of the user data.

The OLT 110 may be configured to create the multi-rate downstream frame 330 in a manner similar to how the OLT 110 creates the standard downstream frame 305, except that the OLT 110 partitions the user data into the payloads 360 and 380 based on a data rate by which the user data should be transmitted. The OLT 110 may determine a data rate by which the user data should be transmitted in various different ways. For example, a service provider may indicate a data rate for certain user data (e.g., Ethernet packets) that are received by a PON 100 via a core network, and the OLT 110 may convert the user data into XGEM frames that may be transmitted in the PON 100. These frames may be packed into, or added to, a particular subframe 340 or 350 based on the indicated data rate. For example, suppose that an OLT 110 receives user data that is indicated to be transmitted at a higher data rate, such as 50G. The OLT 110 may be configured to add the user data to the payload 380A of the subframe 350A when the OLT 110 is generating the multi-rate downstream frame 330A.

As another example, an OLT 110 may be configured to allocate user data to a particular subframe 340 or 350 based on available space. For example, when the OLT 110 is generating a multi-rate transmission packet, suppose that the subframe 340A associated with a 25G data rate is full. In this case, the OLT 110 may dynamically assign the user data to the subframe 350A associated with a 50G data rate, assuming that the subframe 350A still has space left to carry user data. In this way, an OLT 110 may be configured to dynamically allocate user data to subframes 340 or 350 based on traffic within each of the subframes.

Once the OLT 110 packs the user data into the payloads 360 or 380B, the OLT 110 may encapsulate the subframes 340 and 350 to include a header 355 or 370. The header 355 or 370 may be similar to header 310 in that the header 355 or 370 may comprise PSBds. However, the headers 355 or 370 may additionally include information that indicates a data rate associated with the subframe 340 or 350.

In an embodiment, the headers 355 and 370 may indicate the data rate in a field of the header 355 or 370, as will be further described below with reference to FIGS. 5 and 6. In an embodiment, the headers 355 or 370 may include a length 322 of a respective subframe 340 or 350. The length may be a period of time or may be a number of bits or bytes, both of which may indicate the data rate associated with the respective subframe 340 or 350. The length may be a size of the subframe 340 or 350 in bytes, 4 bytes, 8 bytes, or bits. The length may also be a time duration of the subframe 340 or 350, such as microseconds, submicroseconds, or even nanoseconds. In an embodiment, the length 322 of the respective subframe 340 or 350 may be carried in a new field of the PSBd, as described below with reference to FIG. 4. In an embodiment, the length of the respective subframe 340 or 350 may be carried by a reserved field or an unused field of the PSBd, as will be described below with reference to FIG. 6.

Similar to the standard downstream frames 305, an OLT 110 may be configured to continuously transmit multi-rate downstream frames 330 in the downstream direction toward the ONUs 120. As shown in FIG. 3, the multi-rate downstream frames 330 are transmitted continuously without any time gap between the standard downstream frames 305. According to these embodiments, the OLT 110 is configured to transmit data at multiple different data rates instead of a single data rate using the multi-rate downstream frame 330 structure shown in FIG. 3. While FIG. 3 only shows two multi-rate downstream frames 330, it should be appreciated that the OLT 110 is configured to generate and transmit any number of multi-rate downstream frames 330.

In this manner, multiple subframes 340 and 350 (or more) that are associated with different data rates are interleaved together to create the multi-rate downstream frame 330A-B. During transmission, the interleaving of the multiple subframes 340A-B and 350A-B associated with different data rates within the multi-rate downstream frames 330 efficiently transmits user data at different data rates to multiple different ONUs 120.

Figure 5:
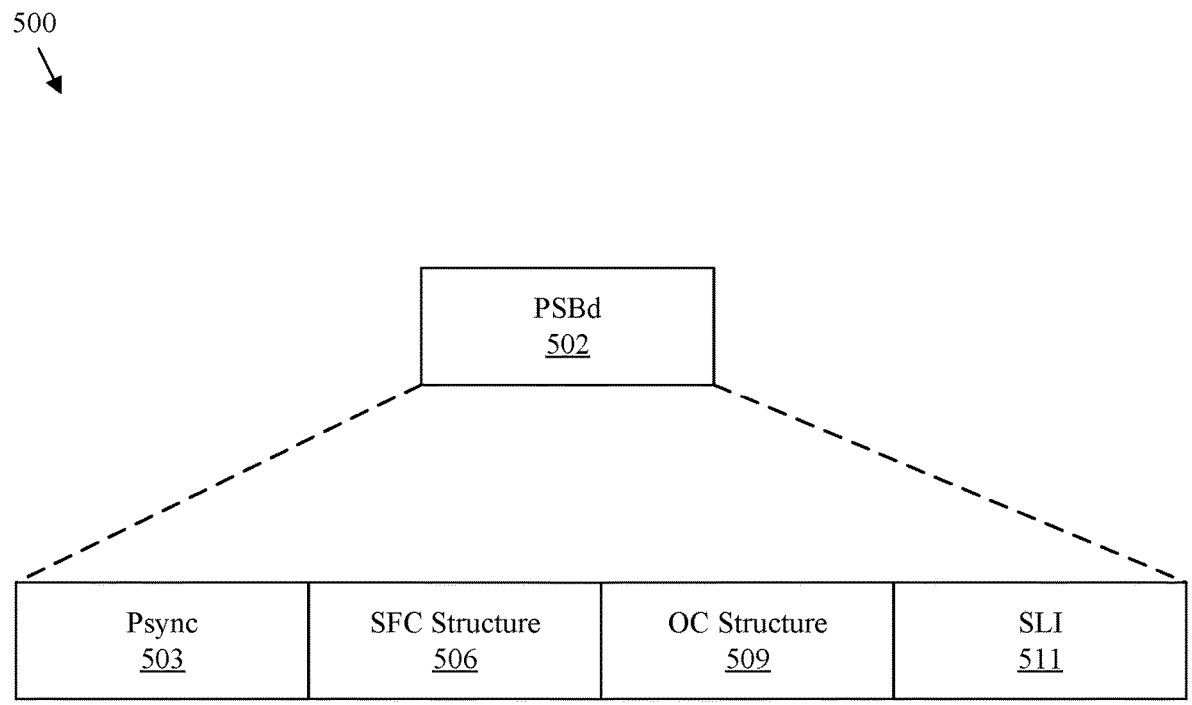
FIG. 5 is a diagram illustrating an example of a header included in a multi-rate downstream frame according to various embodiments of the disclosure.

FIG. 5 is a diagram 500 illustrating an example of a PSBd 502 included in a multi-rate downstream frame 330 according to various embodiments of the disclosure. The PSBd 502 may be similar to the header 355 and 370 of the subframes 340 and 350. The PSBd 502 comprises a Physical Synchronization Sequence (Psync) field 503, a Superframe Counter (SFC) structure field 506, an Operation Control (OC) structure field 509, and a Subframe Length Indicator (SLI) field 511. A standard PSBd, as defined by the G.989.3 Standard Document, may include the PSync field 503, SFC structure field 506, and OC structure field 509. The embodiments disclosed herein add a new field, the SLI field 511, to the standard PSBd to create the PSBd 502.

The Psync field 503 is a physical synchronization sequence that contains a fixed 64-bit pattern, or 8 bytes. The physical synchronization sequence contained in the Psync field 503 may be a specific coding pattern (also referred to herein as a Psync pattern) that supports, or identifies, a corresponding downstream data rate for a subframe 340 or 350. In an embodiment, different data rates correspond to different Psync patterns. In an embodiment, some data rates may correspond to the same Psync pattern. Either way, an ONU 120 may only be configured to correctly detect the Psync pattern that is received at a data rate that is supported by the ONU 120. Other Psync patterns included in the Psync field 503, corresponding to data rates not supported by the ONU 120, will not be recognized by the ONU 120. The ONU 120 may not be able to receive and process subframes 340A-B and 350A-B with Psync patterns that are unrecognizable. An ONU 120 may use this 64-bit Psync pattern to achieve alignment at a boundary of the multi-rate downstream frame 330.

The SFC structure field 506 is a 64-bit, or 8 byte, field that contains a 51-bit SFC value and a 13-bit Hybrid Error Correction (HEC) field. The SFC value in each subframe 340 or 350 of a single multi-rate downstream frame 330 is the same, and the SFC value included in the SFC structure field 506 for each subframe 340 or 350 is incremented by one with respect to the previous multi-rate downstream frame 330. The OC structure field 509 is a 64-bit, or 8 byte field, that contains a 51-bit OC body and 13-bit HEC field. The format of the OC body is further described below with reference to FIG. 6.

In an embodiment, the SLI field 511 is also 64-bits, or 8 bytes. In an embodiment, the SLI field 511 carries a length of the subframe 340 or 350, which is a value that specifies the actual size of the subframe 340 or 350. In an embodiment in which the multi-rate downstream frame 330 contains several subframes 340 or 350 having an equal length, the SLI field 511 may carry a value indicating an amount of subframes 340 or 350 within the multi-rate downstream frame 330. In this case, the SLI field 511 may indicate how many subframes 340 or 350 are included in a 125 μs multi-rate downstream frame 330.

A standard PSBd, as defined by the G.989.3 Standard Document, is 24 bytes. However, after adding the SLI field 511, the PSBd 502 may be 32 bytes. According to this embodiment, a length of the subframe 340 or 350 may be carried within the header 355 and 370 of the subframe 340 or 350. In an embodiment, the OLT 110 is configured to encapsulate the payloads 360 and 380 to include the headers 355 and 370, in which the headers 355 and 370 include the SLI field 511. In an embodiment, when an ONU 120 receives the multi-rate downstream frames 330, the ONU 120 may inspect the headers of the SLI field 511 to determine not just the length of the subframe 340 or 350, but also a data rate of the subframe 340 or 350 based on the length of the subframe 340 or 350 and the pre-defined length 313 of the multi-rate downstream frame 330. In this way, the headers 355 and 370, which may be PSBd 502, signal to the ONU 120 that a new subframe 340 or 350 is being received, and the SLI field 511 within the headers 355 and 370 signal to the ONU 120 a data rate at which the subframe 340 or 350 is to be received.

Figure 6:
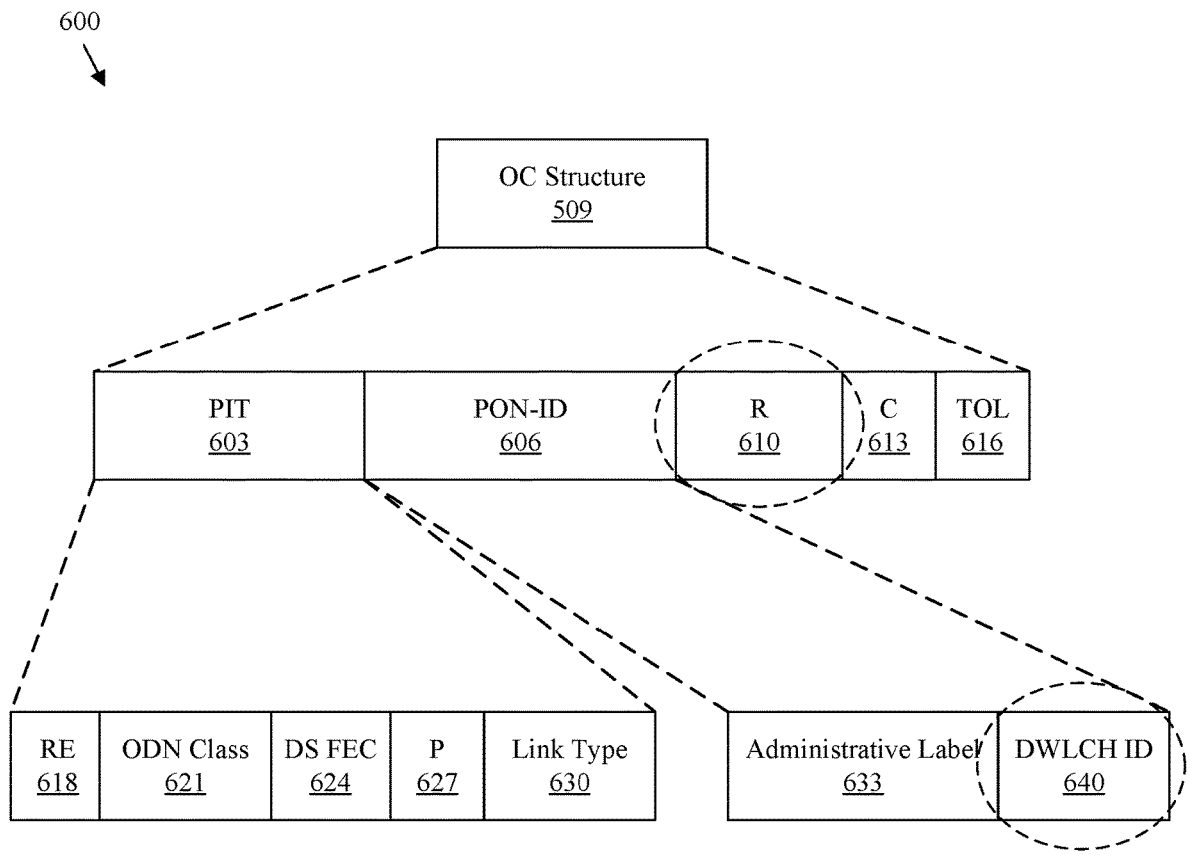
FIG. 6 is a diagram illustrating an example of a portion of a header included in a multi-rate downstream frame according to various embodiments of the disclosure.

FIG. 6 is a diagram of a portion 600 of the PSBd 502 included in a multi-rate downstream frame 330 according to various embodiments of the disclosure. In particular, FIG. 6 shows the various subfields within the OC structure field 509 of the PSBd 502, and the OC structure field 509 includes 51-bits. The diagram shown in FIG. 6 illustrates a mechanism of adding a new field to a PSBd to include a length of a subframe 340 or 350. In contrast, the diagram shown in FIG. 6 illustrates a mechanism of using an existing field in the PSBd 502 to include the length of the subframe 340 or 350.

The OC structure field 509, which is defined by the G.989.3 Standard Document, includes a PON-identifier (ID) Type (PIT) field 603. The PIT field 603 is an 8-bit static field provisioned by an operator of the PON 100 that indicates an ODN architecture, a source of a reported launch power, and an ODN class. The PIT field 603 is further partitioned into a Reach Extender (RE) flag 618, an ODN class field 621, a DS FEC flag 624, a Protocol Indication (P) Flag 627, and a link type field 630. The RE flag 618 is a 1-bit field indicating whether the Transmit Optical Level (TOL) field 616 contains the launch power of the OLT 110 (RE=0) or of a reach extender (RE=1). The ODN class field 621 is a 3-bit field identifying the nominal optical parameters of the transceiver according to ODN optical path loss. The DS FEC flag 624 is a 1 bit flag that indicates whether FEC is enabled in the downstream direction. The P flag 627 is a protocol indication flag indicating a transmission convergence (TC) protocol. The link type field 630 is a 2-bit field indicating an optical link type.

The OC structure field 509, which is defined by the G.989.3 Standard Document, further includes a PON-ID field 606. The PON-ID field is a 32-bit static field provisioned by the operator of the PON 100 that identifies the TWDM channel termination within a certain domain. The PON-ID field 606 includes an administrative label field 633 and a Downstream Wavelength Channel Identification (DWLCH ID) field 640. The administrative label field 633 is a 28-bit field supplied to the OLT 110 in accordance with a numbering plan and is treated transparently by the OLT 110. The DWLCH ID field 640 is a 4-bit field that typically contains a downstream wavelength channel ID for multiple channel PONs. This field may be unused for single channel PONs, such as PON 100 as described herein.

The OC structure field 509, which is defined by the G.989.3 Standard Document, further includes a Reserved (R) field 610, a reference point indicator (C) field 613, and a Transmit Optical Level (TOL) field 616. The R field 610 is a field that is reserved for future use, and may include one or more bits. The C field 613 is a 1-bit field indicating a TOL point indicator, and the TOL field 616 is a 9-bit dynamic field maintained by the system that indicates a launch power of the OLT 110 into the ODN 130.

Based on the fields listed above that are included in the OC structure field 509, the DWLCH ID field 640 and the R field 610 contain reserved and/or unused bits. In an embodiment, the length of the subframes 340 or 350 may be carried in either the DWLCH ID field 640 or the R field 610. As described above, the length of the subframes 340 or 350 includes a value that specifies the actual size of the subframe 340 or 350. In an embodiment in which the multi-rate downstream frame 330 contains several subframes 340 or 350 having an equal length, the DWLCH ID field 640 or the R field 610 may carry a value indicating an amount of subframes 340 or 350 within the multi-rate downstream frame 330. In this case, the DWLCH ID field 640 or the R field 610 may indicate how many subframes 340 or 350 are included in a 125 μs multi-rate downstream frame 330.

According to this embodiment, a length of the subframe 340 or 350 may be carried within the header 355 and 370 of the subframe 340 or 350. In an embodiment, the OLT 110 is configured to encapsulate the payloads 360 and 380 to include the headers 355 and 370, in which the headers 355 and 370 include the DWLCH ID field 640 and the R field 610. The length of the subframe 340 or 350 may be carried in the DWLCH ID field 640 or the R field 610. In an embodiment, when an ONU 120 receives the multi-rate downstream frames 330, the ONU 120 may inspect the DWLCH ID field 640 or the R field 610 within the headers 355 and 370 of the subframes 340 and 340 to determine not just the length of the subframe 340 or 350, but also a data rate of the subframe 340 or 350 based on the length of the subframe 340 or 350 and the pre-defined length 313 of the multi-rate downstream frame 330. In this way, the header 355 and 370, which may be PSBd 502, signals to the ONU 120 that a new subframe 340 or 350 is being received, and the DWLCH ID field 640 or the R field 610 within the headers 355 and 370 indicates to the ONU 120 a data rate at which the subframe 340 or 350 is to be received.

Figure 7:
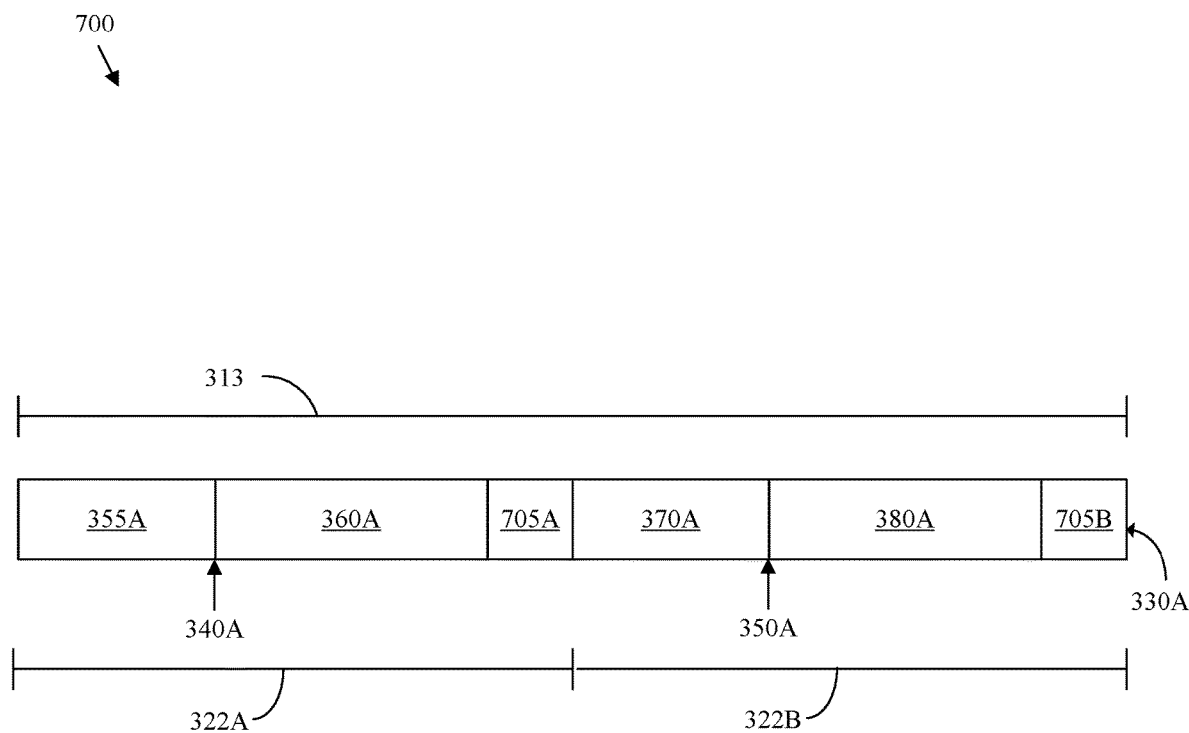
FIG. 7 is a diagram illustrating an example of a multi-rate downstream frame including End-of-Subframe (EoS) indicators according to various embodiments of the disclosure.

FIG. 7 is a diagram 700 illustrating an example of the multi-rate downstream frame 330A including EoS indicators 705A-B according to various embodiments of the disclosure. The multi-rate downstream frame 330A is similar to the multi-rate downstream frame 330A shown in FIG. 3 in that the multi-rate downstream frame 330A includes subframes 340A and 350A. However, the subframes 340A and 350A include respective EoS indicators 705A-B. The EoS indicators 705A-B are positioned, or disposed, at the ends of the subframes 340A and 350A. In particular, EoS indicator 705A is positioned at the end of the subframe 340A, and EoS indicator 705B is positioned at the end of the subframe 350A.

In an embodiment, the EoS indicators 705A-B may include a pre-defined number of unused, or empty, bits that add indicate the end of a subframe 340 or 350. For example, EoS indicator 705A indicates an end, or a boundary, of the subframe 340A, and the EoS indicator 705B indicates an end, or a boundary, of the subframe 350A. In this way, the EoS indicators 705A-B are paddings between subframes 340A and 350A.

In an embodiment, the OLT 110 may be configured to add the EoS indicators 705A-B to the end of the subframes 340A and 350A after encapsulating the payloads 360A and 380A to include the headers 355A and 370A. As described above, the OLT 110 is configured to continuously transmit multi-rate downstream frame 330A, and thus, continuously transmits subframes 340A and 350A.

Therefore, ONUs 120 that receive continuous downstream transmissions from the OLT 110 may use the EoS indicators 705A-B to determine an end boundary of the subframes 340A and 350A. In an embodiment, ONUs 120 may also use the Psync field 503 to determine a beginning boundary of each of the subframes 340A and 350A. As described below with reference to FIGS. 7 and 9, the ONUs 120 may be configured to only process subframes 340A and 350A associated with a data rate that is supported by the ONU 120. The ONUs 120 may use the Psync field 503 and EoS indicator 705A-B to identify the boundaries of the subframe 340A and 350A. The ONUs 120 may also use the length of the subframe 340A and 350A carried by the SLI field 511, the DWLCH ID field 640, or the R field 610 within the header 355A or 370A to identify the boundaries and/or the data rate associated with the subframe 340A and 350A.

Figure 8:
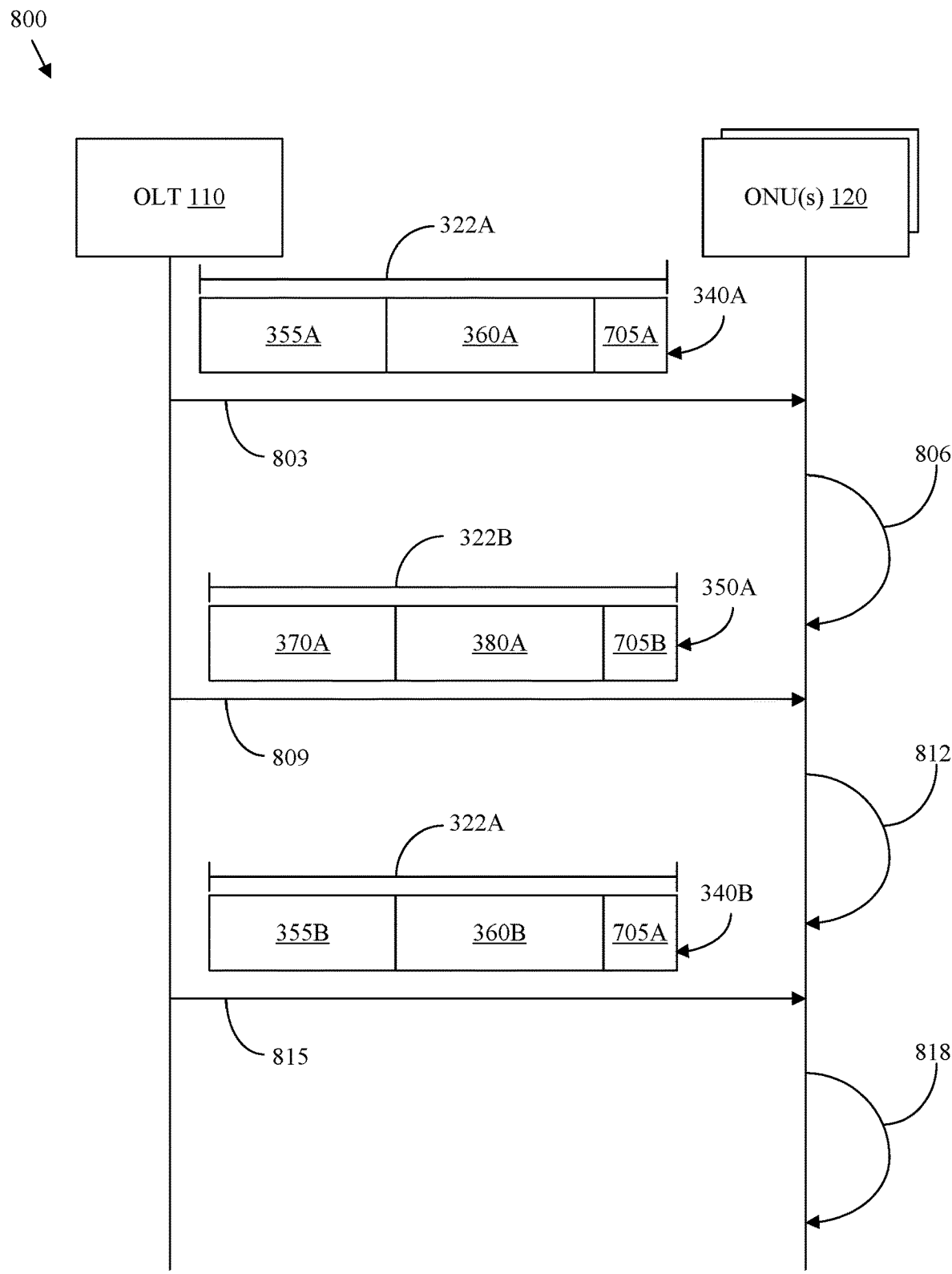
FIG. 8 is a message sequence diagram illustrating a method of processing subframes within a multi-rate downstream frame according to various embodiments of the disclosure.

FIG. 8 is a message sequence diagram illustrating a method 800 of processing the subframes 340A-B and 350B within the multi-rate downstream frames 330A-B according to various embodiments of the disclosure. The method 800 is implemented by the OLT 110 and one or more ONUs 120 during the downstream transmissions of multi-rate downstream frames 330A-B from the OLT 110 to the one or more ONUs 120.

The OLT 110 may be configured to transmit at one or more data rates, such as 1G, 2.5G, 10G, 25G, 50G, or 100G. Similarly, an ONU 120 may be configured to receive data at one or more of these data rates. However, in some cases, an ONU 120 may not be configured to receive data at all of the data rates. For example, a first ONU 120 may be configured to receive downstream data only at data rates of 1G, 2.5G, 10G, or 25G. Meanwhile, a second ONU 120 may be configured to receive downstream data only at data rates of 1G, 2.5G, or 10G. Similarly, a third ONU 120 may be configured to receive downstream data at all the data rates of 1G, 2.5G, 10G, 25G, 50G, or 100G. In this way, one OLT 110 may transmit a multi-rate downstream frame 330 to multiple different ONUs 120, in which each ONU 120 may only be capable of receiving data at a limited number of data rates. Regarding method 800, the ONU 120 shown in FIG. 8 may be the first ONU 120 that is capable of receiving downstream data only at 1G, 2.5G, 10G, or 25G.

At step 803, an OLT 110 may transmit a first subframe 340A of the first multi-rate downstream frame 330A to the ONU 120. As described above, the first subframe 340A is associated with a 25G data rate based on the payload 360A comprising user data that is to be transmitted by the OLT 110 to the ONU 120 at 25G. Therefore, the OLT 110 may transmit the first subframe 340A at the 25G data rate.

At step 806, the ONU 120 receives the first subframe 340A and begins processing the first subframe 340A. In an embodiment, the ONU 120 may be configured to determine the data rate associated with the first subframe 340A based on the header 355A. As described above with reference to FIGS. 5 and 6, a length of the first subframe 340A may be carried in a new SLI field 511 of the header 355A, which may be a PSBd 502. The length of the first subframe 340A may also be carried in an existing field of the PSBd 502 that is not used (e.g., the DWLCH ID field 640 or the R field 610).

In an embodiment, the ONU 120 may parse the header 355A, which may be a PSBd 502, of the first subframe 340A to determine the length of the first subframe 340A. The ONU 120 may extract the length of the first subframe 340A from the SLI field 511, the DWLCH ID field 640, or the R field 610 of the header 355A.

In an embodiment, the ONU 120 may determine whether the data rate associated with the first subframe 340A is supported by the ONU 120 based on the Psync pattern included in the Psync field 503 of the header 355A. In the example shown in method 800, the ONU 120 is configured to determine whether the data rate associated with the first subframe 340A is 1G, 2.5G, 10G, or 25G, since these are the only data rates supported by ONU 120. Since the data rate associated with the first subframe 340A is 25G, the ONU 120 supports the data rate by which the first subframe 340A is received.

Once the ONU 120 determines the data rate for the first subframe 340A, the ONU 120 may use the length of the first subframe 340A extracted from the header 355A to process the data within the first subframe 340A. In an embodiment, the length of the first subframe 340A may define a number of bits of the first subframe 340A, and the ONU 120 may be configured to keep a count of the bits from the first subframe 340A that are being processed. When the count of the bits that have been processed matches the length of the first subframe 340A extracted from the header 355A, the ONU 120 may terminate processing of the first subframe 340A in response to determining that the first subframe 340A has completed processing.

In an embodiment, the ONU 120 may not need to use the length of the first subframe 340A extracted from the header 355A to determine that the first subframe 340A has completed processing. In this case, the ONU 120 may use the EoS indicator 705A to determine when to terminate processing of the first subframe 340A because the EoS indicator 705A indicates an end of the first subframe 340A.

Once the ONU 120 determines that the first subframe 340A has ended, the ONU 120 may return to a state of waiting for downstream transmissions from the OLT 110 that are supported by the ONU 120. At step 809, the OLT 110 may transmit a second subframe 350A of the multi-rate downstream frame 330A to the ONU 120. As described above, the second subframe 350A is associated with a data rate of 50G based on the payload 380A comprising user data that is to be transmitted by the OLT 110 to the ONU 120 at 50G.

As described above, ONU 120 is only capable of receiving data at 1G, 2.5G, 10G, or 25G. Therefore, the ONU 120 shown in the example of method 800 is not capable of receiving the data in the second subframe 350A. At step 812, the ONU 120 receives the second subframe 350A and begins processing the second subframe 350A. In response to determining that the second subframe 350A is associated with a data rate that is not supported by the ONU 120, the ONU 120 may not be able to recognize or process the payload 380A of the second subframe 350A. When the ONU 120 is ignoring the second subframe 350A, the ONU 120 may simply remain in the state of waiting for downstream transmissions from the OLT 110 that are supported by the ONU 120. In an embodiment, the contents of the second subframe 350A may be discarded by the ONU 120.

In an embodiment, the ONU 120 may determine an end of the second subframe 350A based on a length of the second subframe 350A that is carried in the header 370A or based on the EoS indicator 705B. In this embodiment, ONU 120 may then wait to receive another subframe 340B (referred to hereinafter as a third subframe 340B) that is part of the second multi-rate downstream frame 330B.

At step 815, the OLT 110 may transmit the third subframe 340B of the second multi-rate downstream frame 330B to the ONU 120. As described above, the third subframe 340B is similar to the first subframe 340A in that the third subframe 340B is also associated with a data rate of 25G based on the payload 360B comprising user data that is to be transmitted by the OLT 110 to the ONU 120 at 25G. Therefore, the OLT 110 may transmit the third subframe 340B at 25G.

At step 818, the ONU 120 receives the third subframe 340B and begins processing the third subframe 340B. Similar to step 806, the ONU 120 is configured to determine the data rate associated with the third subframe 340B and a length of the third subframe 340B. The ONU 120 may determine that, since the data rate associated with the third subframe 340B is 25G, the ONU 120 supports the data rate by which the third subframe 340B is received.

As shown by method 800, the ONU 120 may be compatible with the multi-rate downstream frames 330A-B even when the ONU 120 may not support all the data rates that are being transmitted within a multi-rate downstream frame 330A-B. The ONUs 120 may be configured to only process the subframes 340A-B and 350A-B that are associated with data rates that are supported by the ONU 120. The ONUs 120 may not be configured to recognize and process the subframes 340A-B and 350A-B that are associated with data rates that are not supported by the ONU 120.

In an embodiment, an OLT 110 may be configured to maintain a common order of the subframes 340A-B and 350A-B within each multi-rate downstream frame 330 transmitted by the OLT 110. For example, the multi-rate downstream frames 330A-B shown by FIG. 3 and discussed in method 800 include two subframes 340A-B and 350A-B, in which the first subframe 340A-B is associated with a first data rate (25G) and has a first length, and the second subframe 350 A-B is associated with a second data rate (50G) and has a second length. The OLT 110 may be configured to continue generating multi-rate downstream frames 350 with the same format, in which the first subframe 340A-B associated with first data rate is positioned before the second subframe 350A-B associated with the second data rate. The OLT 110 may be configured to continue generating multi-rate downstream frames 350 with the same lengths as well.

In an embodiment, the ONUs 120 may be configured to recognize the order of subframes 340A-B and 350A-B within a multi-rate downstream frame 330A-B such that the ONU 120 may not need to parse through the headers 355A-B and 370A-B of the subframes 340A-B and 350A-B every time a new multi-rate downstream frame 330A-B is transmitted. For example, an ONU 120 may be configured to perform steps 806 and 812 for all of the subframes 340A-B and 350A-B within a multi-rate downstream frame 330A. Once the ONU 120 processes a first multi-rate downstream frame 330A, then the ONU 120 may not need to perform the steps of examining the headers 355A-B or 370A-B for all the subsequent multi-rate downstream frames 330 transmitted by the OLT 110. Instead, the ONU 120 may be configured to store the format of the multi-rate downstream frame 330A and the lengths of the subframes 340A-B and 350A-B to process subsequent multi-rate downstream frames 330 based on the stored format.

While only two subframes 340A-B and 350A-B are discussed as being part of the multi-rate downstream frame 330A-B, it should be appreciated that the multi-rate downstream frames 330A-B may include any number of subframes 340A-B and 350A-B that are each associated with different data rates. In this case, the OLT 110 may be configured to maintain the order of all of the subframes 340 and 350 within the multi-rate downstream frame 330 to ensure that the ONU 120 may synchronize with the multi-rate downstream frame 330 efficiently and effectively.

Figure 9:
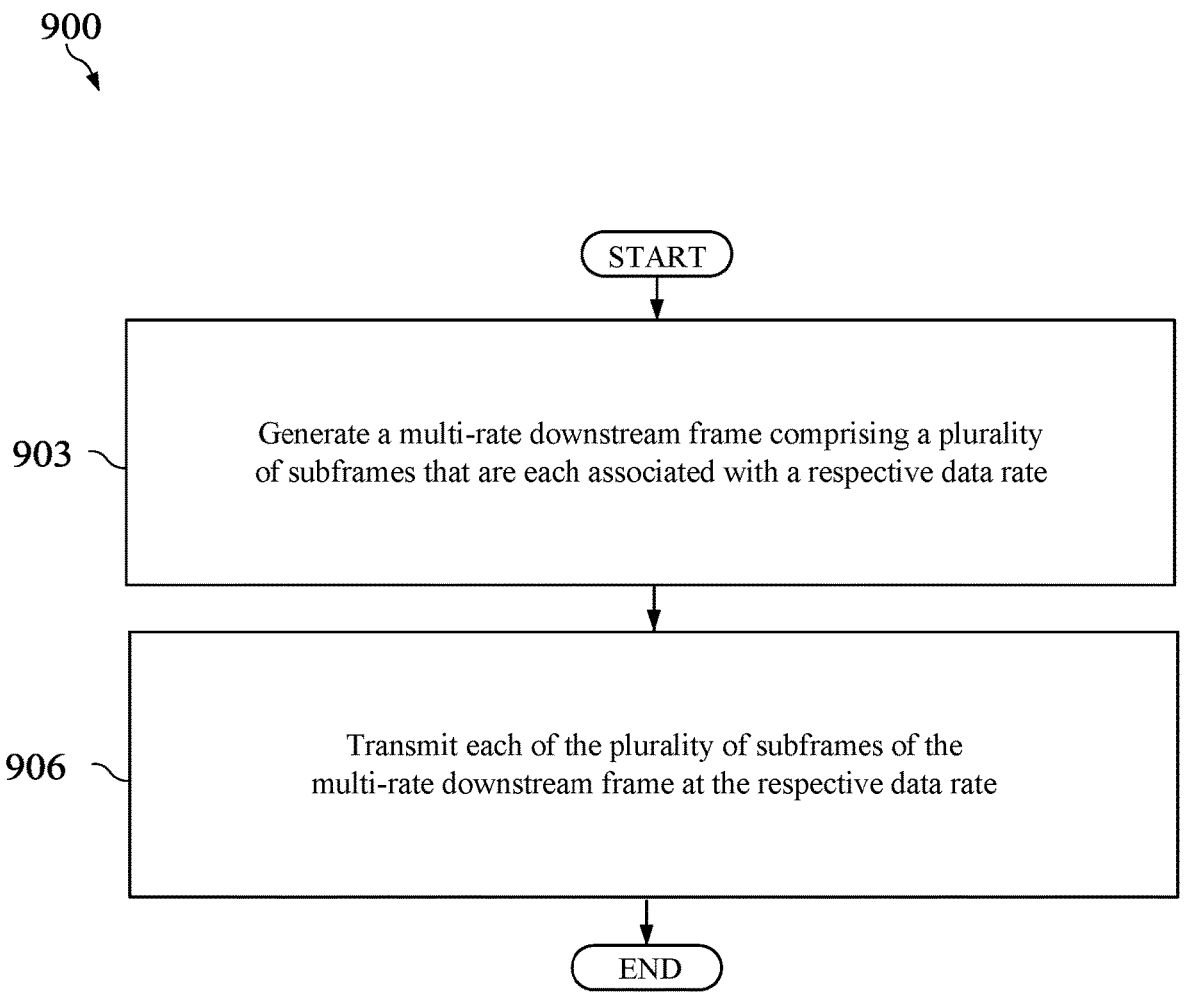
FIG. 9 is a flowchart of a method of generating and transmitting a multi-rate downstream frame according to various embodiments of the disclosure.

FIG. 9 is a flowchart of a method 900 of generating and transmitting a multi-rate downstream frame according to various embodiments of the disclosure. The method 900 may be implemented by the apparatus 200 or the OLT 110 after receiving Ethernet frames via a core network and generating XGEM frames based on the Ethernet packets. The XGEM frames may be sorted into buffers based on a data rate associated with the XGEM frames.

At step 903, a multi-rate downstream frame 330A-B may be generated having a pre-defined length 313. For example, the multi-rate downstream module 270 may be implemented by the processor 230 to generate the multi-rate downstream frame 330A-B. In an embodiment, the multi-rate downstream frame 330A-B may comprise a plurality of subframes 340A-B and 350A-B that are each associated with a respective data rate.

In an embodiment, the multi-rate downstream frame 330A-B is generated by encapsulating each of the subframes 340A-B and 350A-B to include a header 355A-B and 370A-B that indicates a boundary of the subframe 340A-B and 350A-B. In an embodiment, a length of the subframe 340A-B and 350A-B may be carried in an SLI field 511 of the header 355A-B and 370A-B. In an embodiment, a length of the subframe 340A-B and 350A-B may be carried in a DWLCH ID field 640 or the R field 610 of the header 355A-B and 370A-B. In an embodiment, the header 355A-B and 370A-B may be a PSBd 502. In an embodiment, the pre-defined length 313 may be 125 μs. The subframe 340A-B may include a payload 360A-B including the XGEM frames associated with the first data rate. The subframe 350A-B may include a payload 380A-B including the XGEM frames associated with the first data rate.

At step 906, each of the plurality of subframes 340A-B and 350A-B of the multi-rate downstream frames 330A-B may be transmitted at the respective data rate to an ONU 120 via a PON 100. For example, the TX 240 may be configured to transmit each of the plurality of subframes 340A-B and 350A-B of the multi-rate downstream frame 330A-B at the respective data rate to an ONU 120 via a PON 100.

Figure 10:
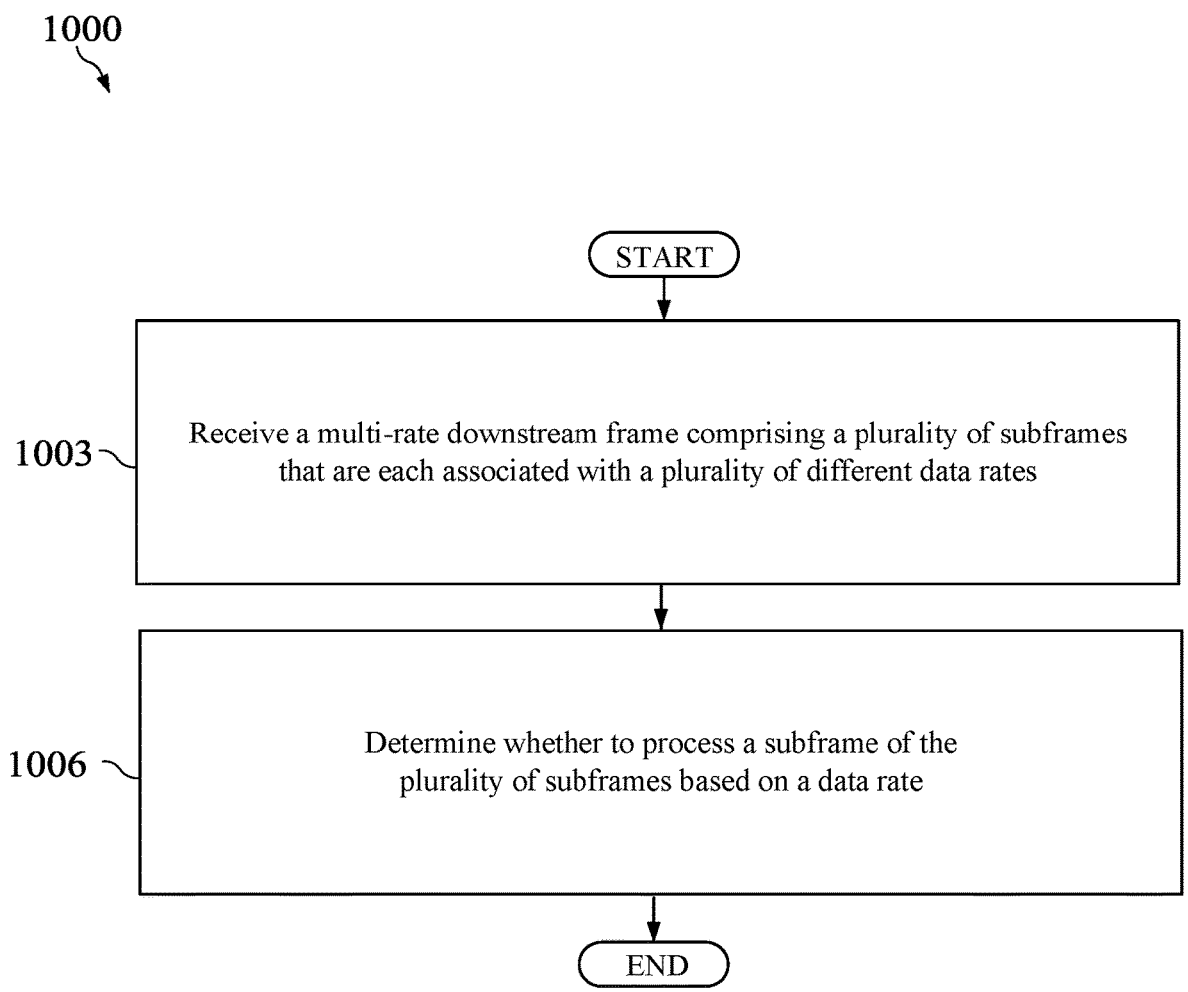
FIG. 10 is a flowchart of a method of receiving and processing a multi-rate downstream frame according to various embodiments of the disclosure.

FIG. 10 is a flowchart of a method 1000 of receiving and processing a multi-rate downstream frame according to various embodiments of the disclosure. The method 1000 may be implemented by the apparatus 200 or the ONU 120 after the OLT 110 has transmitted the plurality of subframes 340A-B and 350A-B of the multi-rate downstream frame 330A-B.

At step 1003, a multi-rate downstream frame 330 having a pre-defined length 313 is received from the OLT 110. For example, the RX 220 may be configured to receive the multi-rate downstream frame 330 having the pre-defined length 313 from the OLT 110. In an embodiment, the multi-rate downstream frame 330 may comprise a plurality of subframes 340 and 350 that are each associated with a respective data rate.

At step 1006, a determination is made as to whether to process the subframes 340 and 350 based on a data rate indicated in the headers 355 and 370 of the subframes 340 and 350. For example, the multi-rate downstream module 270 may be implemented by the processor 230 to determine whether to process the subframes 340 and 350 based on the data rate indicated in the headers 355 and 370 of the subframes 340 and 350.

In an embodiment, the headers 355 and 370 may be a PSBd 502. In an embodiment, a determination of whether the data rate is supported by the ONU 120 is made based on the Psync pattern included in the Psync field 503.

In an embodiment, the subframes 340 and 350 may be processed in response to the headers 355 and 370 of the subframes indicating whether the data rate of the subframes 340 and 350 is supported by the ONU 120. For example, the subframes 340 and 350 may be processed in response to determining that the headers 355 and 370 indicate that the data rate of the subframes 340 and 350 is supported by the ONU 120. When the ONU 120 is not capable of recognizing or processing the data rate of the subframes 340 and 350, the ONU 120 may be configured to wait until a subframe 340 or 350 with a compatible data rate is received.

Figure 11:
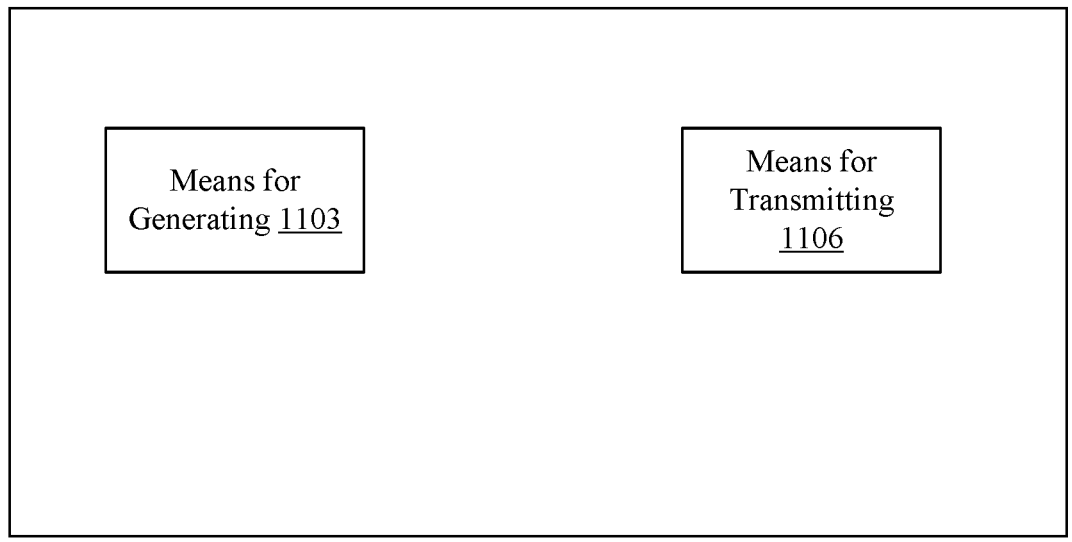
FIG. 11 is a diagram illustrating an apparatus configured to generate and transmit a multi-rate downstream frame according to various embodiments of the disclosure.

FIG. 11 is a diagram illustrating an apparatus 1100 configured to generate and transmit a multi-rate downstream frame 330B according to various embodiments of the disclosure. Apparatus 1100 comprises a means for generating 1103 and a means for transmitting 1106. The means for generating 1103 comprises a means for generating a multi-rate downstream frame 330 having a pre-defined length 313, the multi-rate downstream frame 330 comprising a plurality of subframes 340 and 350 that are each associated with a respective data rate. The means for transmitting 1106 comprises a means for transmitting each of the plurality of subframes 340 and 350 of the multi-rate downstream frame 330 at the respective data rate to an ONU 120 via a PON 100.

Figure 12:
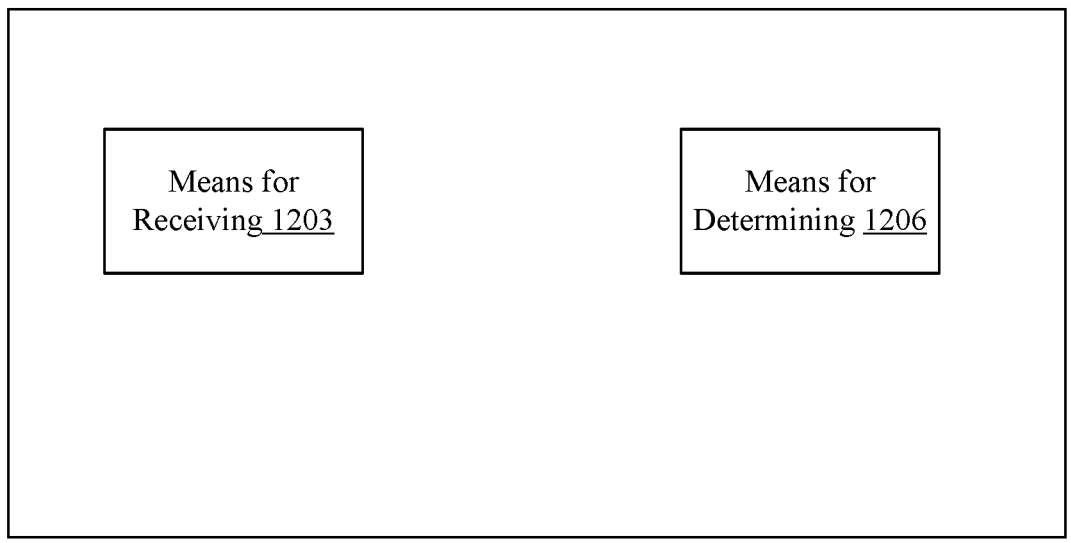
FIG. 12 is a diagram illustrating an apparatus configured to receive and process a multi-rate downstream frame according to various embodiments of the disclosure.

FIG. 12 is a diagram illustrating an apparatus 1200 configured to receive and process a multi-rate downstream frame 330 according to various embodiments of the disclosure. Apparatus 1200 comprises a means for receiving 1203 and a means for determining 1206. The means for receiving 1203 comprises a means for receiving a multi-rate downstream frame 330 having a pre-defined length 313 from an OLT 110 via a PON 100, the multi-rate downstream frame 330 comprising a plurality of subframes 340 and 350 that are each associated with a respective data rate. The means for determining 1206 comprises a means for determining whether to process a subframe 340 or 350 based on a data rate indicated in a header 355 or 370 of the subframe 340 or 350.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical line terminal (OLT) comprising:
a memory storing instructions; and
at least one processor in communication with the memory, the at least one processor configured, upon execution of the instructions, to perform the following steps:
generate a multi-rate downstream frame having a pre-defined length, the multi-rate downstream frame comprising a plurality of subframes, each subframe being associated with a respective subframe data rate and a respective subframe length; and
encapsulate the each subframe to include a header carrying the respective subframe length, with a sum of the respective subframe lengths of the plurality of subframes being equal to the pre-defined length of the multi-rate downstream frame; and
a transmitter coupled to the processor and configured to transmit the each subframe of the plurality of subframes of the multi-rate downstream frame at the respective subframe data rate.

2. The OLT of claim 1, wherein the processor is further configured to encapsulate the each subframe of the plurality of subframes to include the header that indicates a frame boundary of the each subframe and the respective subframe data rate associated with the each subframe.

3. The OLT of claim 1, wherein the processor is further configured to encapsulate the each subframe of the plurality of subframes to include a physical synchronization block (PSBd), the PSBd comprising a Subframe Length Indicator (SLI) field that indicates the respective subframe length of the each subframe.

4. The OLT of claim 1, wherein the processor is further configured to encapsulate the each subframe of the plurality of subframes to include a physical synchronization block (PSBd), the respective subframe length of the each subframe being carried in a reserved or unused field of the PSBd.

5. The OLT of claim 1, wherein the processor is further configured to insert an End-of-Subframe (EoS) indicator between subframes of the plurality of subframes during transmission.

6. The OLT of claim 1, wherein the pre-defined length of the multi-rate downstream frame is 125 microseconds.

7. The OLT of claim 1, wherein the plurality of subframes comprises a first subframe and a second subframe, the first subframe being associated with the respective subframe data rate of 25 gigabits per second (25G), and the second subframe being associated with the respective subframe data rate of 50 gigabits per second (50G).

8. The OLT of claim 7, wherein a first portion of the multi-rate downstream frame is allocated to the first subframe, and a second portion of the multi-rate downstream frame is allocated to the second subframe.

9. A non-transitory computer-readable media storing computer instructions for an optical line terminal (OLT) that configures at least one processor, upon execution of the instructions, to perform the following steps:
generate a multi-rate downstream frame having a pre-defined length, the multi-rate downstream frame comprising a plurality of subframes, each subframe being associated with a respective subframe data rate and a respective subframe length;
encapsulate the each subframe to include a header carrying the respective subframe length, with a sum of the respective subframe lengths of the plurality of subframes being equal to the pre-defined length of the multi-rate downstream frame; and
transmit the each subframe of the plurality of subframes of the multi-rate downstream frame at the respective subframe data rate.

10. The computer program product of claim 9, wherein the computer executable instructions, when executed by the processor, further cause the processor to encapsulate the each subframe of the plurality of subframes to include the header that indicates a frame boundary of the each subframe and the respective subframe data rate associated with the each subframe.

11. The computer program product of claim 9, wherein the each subframe of the plurality of subframes has a different subframe length that is less than the pre-defined length.

12. The computer program product of claim 9, wherein the each subframe of the plurality of subframes has a common subframe length that is less than the pre-defined length.

13. The computer program product of claim 9, wherein the computer executable instructions, when executed by the processor, further cause the processor to:

combine a plurality of first payload frames associated with a first subframe data rate to create a first subframe of the plurality of subframes;

combine a plurality second payload frames associated with a second subframe data rate to create a second payload for a second subframe of the plurality of subframes;

encapsulate the first subframe to include a first header indicating the first subframe data rate; and encapsulate the second subframe to include a second header indicating the second subframe data rate, wherein the first subframe and the second subframe are continuously transmitted.

14. A method implemented by an optical line terminal (OLT), the method comprising:

generating, by the OLT, a multi-rate downstream frame having a pre-defined length, the multi-rate downstream frame comprising a plurality of subframes, each subframe being associated with a respective subframe data rate and a respective subframe length;

encapsulating, by the OLT, the each subframe to include a header carrying the respective subframe length, with a sum of the respective subframe lengths of the plurality of subframes being equal to the pre-defined length of the multi-rate downstream frame; and transmitting, by the OLT, the each subframe of the plurality of subframes at the respective subframe data rate.

15. The method of claim 14, wherein generating the multi-rate downstream frame comprises encapsulating, by the OLT, the each subframe of the plurality of subframes to include the header that indicates a frame boundary of the each subframe and the respective subframe data rate associated with the each subframe.

16. The method of claim 14, wherein generating the multi-rate downstream frame comprises encapsulating, by the OLT, the each subframe of the plurality of subframes to include a physical synchronization block (PSBd), the PSBd comprising a Subframe Length Indicator (SLI) field that indicates the respective subframe length of the each subframe.

17. The method of claim 14, wherein generating the multi-rate downstream frame comprises encapsulating, by the OLT, the each subframe of the plurality of subframes to include a physical synchronization block (PSBd), the respective subframe length of the each subframe being carried in a reserved or unused field of the PSBd.

18. The method of claim 14, further comprising inserting, by the OLT, an End-of-Subframe (EoS) indicator between subframes of the plurality of subframes during transmission.

19. The method of claim 14, wherein the pre-defined length of the multi-rate downstream frame is 125 microseconds.

20. The method of claim 14, wherein the plurality of subframes comprises a first subframe and a second subframe, the first subframe being associated with the respective subframe data rate of 25 gigabits per second (25G), and the second subframe being associated with the respective subframe data rate of 50 gigabits per second (50G).

21. An optical network unit (ONU) comprising:

a receiver configured to receive a multi-rate downstream frame, with the multi-rate downstream frame having a pre-defined length and comprising a plurality of subframes that are each associated with a respective subframe data rate and a respective subframe length; and a processor coupled to the receiver and configured to:

inspect a header of each subframe of the plurality of subframes to obtain the respective subframe length, with a sum of the respective subframe lengths of the plurality of subframes being equal to the pre-defined length of the multi-rate downstream frame; and determine whether to process a subframe of the plurality of subframes based on the respective subframe data rate indicated in the header of the subframe.

22. The ONU of claim 21, wherein the processor is further configured to process the subframe of the plurality of subframes in response to the header of the subframe indicating the respective subframe data rate that is supported by the ONU.

23. The ONU of claim 21, wherein the processor is further configured to ignore the subframe of the plurality of subframes in response to the header of the subframe indicating the respective subframe data rate that is not supported by the ONU.

* * * * *